Aug. 19, 1924.

F. V. ELBERTZ ET AL 1,505,247

RESILIENT WHEEL

Filed Feb. 6, 1922

Inventors.
FRANK V. ELBERTZ
GIUSEPPE FERRARI

Attorneys

Aug. 19, 1924.　　　　　　　　　　　　　　　　　1,505,247
F. V. ELBERTZ ET AL
RESILIENT WHEEL
Filed Feb. 6, 1922　　　　　　　　2 Sheets-Sheet 2
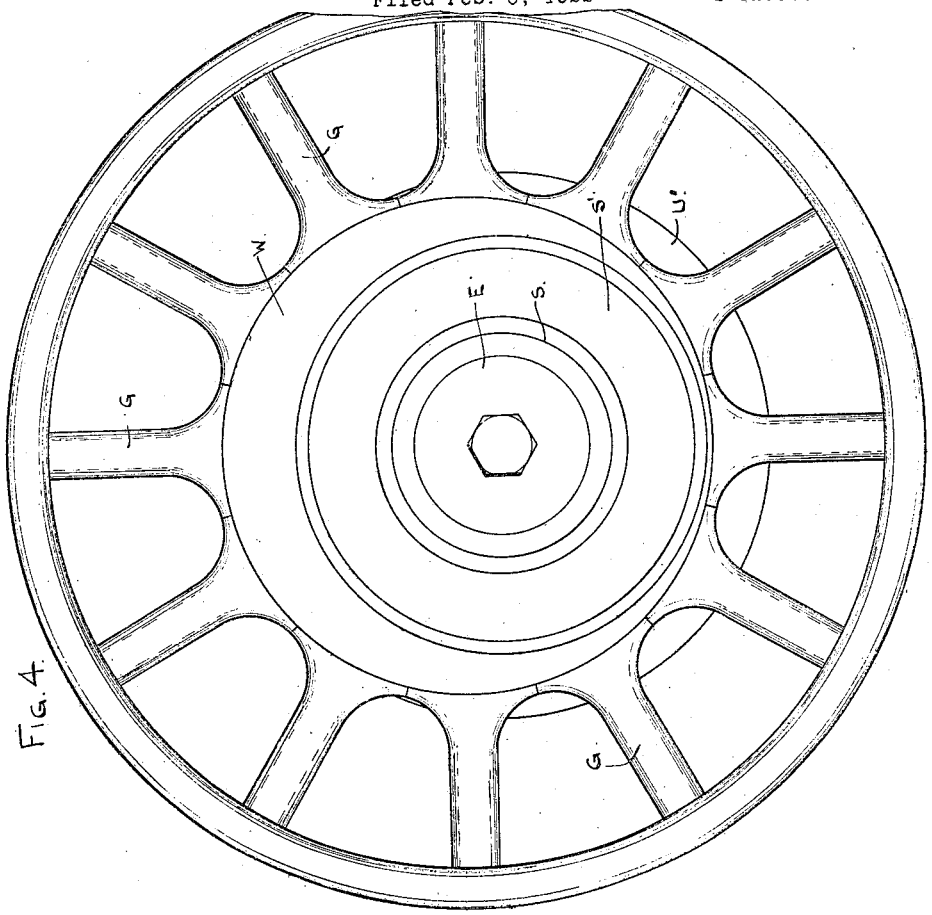
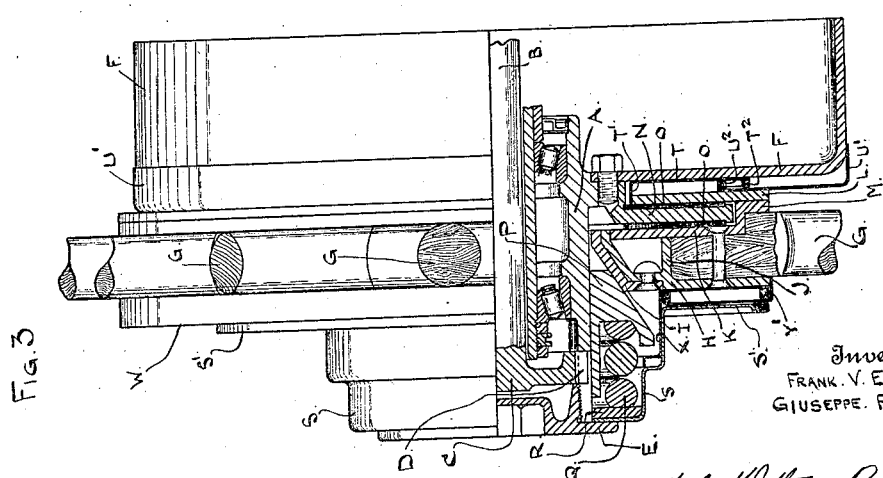

Patented Aug. 19, 1924.

1,505,247

UNITED STATES PATENT OFFICE.

FRANK V. ELBERTZ AND GIUSEPPE FERRARI, OF DETROIT, MICHIGAN; SAID ELBERTZ ASSIGNOR TO SAID FERRARI.

RESILIENT WHEEL.

Application filed February 6, 1922. Serial No. 534,414.

*To all whom it may concern:*

Be it known that we, FRANK V. ELBERTZ and GIUSEPPE FERRARI, both citizens of the United States of America, residing at Detroit, in the county of Wayne and State of Michigan, have invented certain new and useful Improvements in Resilient Wheels, of which the following is a specification, reference being had therein to the accompanying drawings.

The invention relates to resilient wheels of that type in which an annular outer section of the wheel is normally supported upon a conical seat member, which is laterally resiliently displaceable to permit the radial displacement of said annular member. With wheels of this type it is necessary to provide guides for holding the radially displaceable annular member in its plane, and as the wheel is exposed to the dust of the road it is desirable to protect such guide bearings from the grit. Also, it is desirable to lubricate the laterally displaceable conical member and to prevent the escape of this lubricant from the wheel. We have therefore devised a construction which accomplishes these desired results, which is shown in the accompanying drawings:

Figure 3 is a view similar to Figure 1 showing the parts in a different position of adjustment;

Figure 4 is an elevation of the complete wheel.

Figure 1:
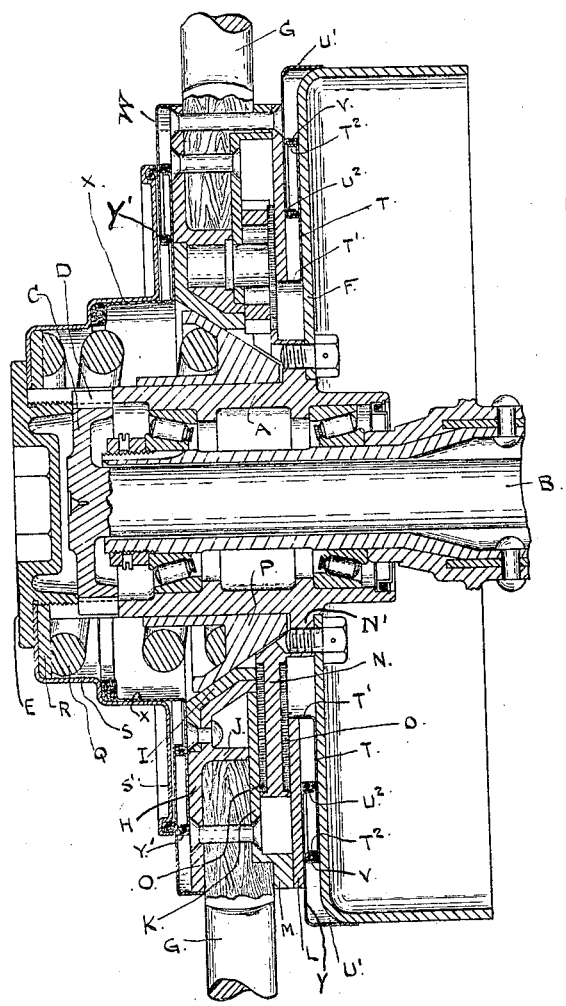
Figure 1 is a cross-section through the hub of the wheel.
Figure 2:
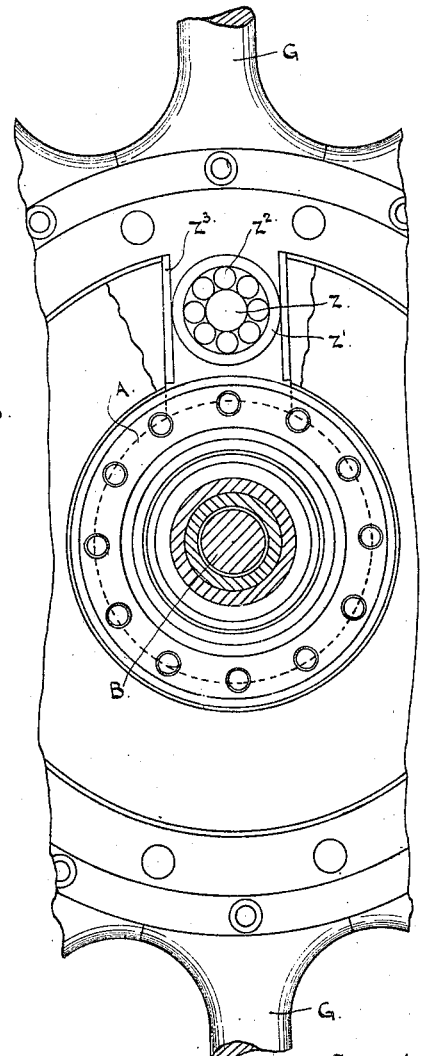
Figure 2 is a sectional elevation thereof.

A is the hub of the wheel, which may be of any desired construction, excepting as hereinafter specifically described. B is the live axle extending through said hub. C is a head on this axle which has a spline engagement with the hub, as indicated at D. E is the hub cap, and F the brake drum.

The radially displaceable portion of my wheel comprises a series of spokes G which are mounted in an inner annular metallic member H. This member is provided with a conical seat portion I and a surrounding annular flange J, which latter forms an abutment for the inner ends of the spokes. The spokes are clamped between the member H and an annular clamping plate K. There is also provided an annular plate L, which is spaced from the member K and secured to an outwardly offset peripheral portion M thereof, thereby forming between said plates an annular pocket. This pocket receives an annular flange N having an offset portion N' formed integral with the hub having provided on opposite sides thereof suitable facing material O, such, for instance, as used for brake linings. The outer diameter of the flange N is less than that of the peripheral portion M of the member K and thus a radial displacement is permitted, while the plane of the wheel is maintained constant by the members N, K and L.

The bearing for the annular member upon the hub is formed by a conical annular member P that is sleeved on the outer cylindrical surface of the hub and that is normally within the flange N. This member P is in engagement with a heavy coiled spring Q, which, at its outer end, abuts against a bearing R in a cap member S retained by the hub cap E. The arrangement is such that whenever there is an excessive radial load or shock which will displace the annular outer portion of the wheel, this will force the conical member P laterally against the tension of the spring Q and upon the relief of the load or the shock, said conical member, under the actuation of the spring, will again restore the annular member to concentric relation.

As has been stated, it is important to keep the dust and grit from contact with the bearings of the wheel. This we accomplish by dust guards upon opposite sides of the wheel, which are of the following construction: T is an annular member, preferably formed of sheet metal, that has a flange T' at its inner edge extending across the space between the flange N and the brake drum F. Y is a similar sheet metal annular member having a flange U', which peripherally engages the brake drum and which at its inner edge is arranged between the member T and the plate L. The members T and Y are also provided respectively with flanges T² and U² which support annular packing rings V, these forming wipers and seals which prevent the ingress of dust or the leakage outward of lubricant. A similar dust guard and lubricant retaining system is formed at the front of the wheel by the cap member S, which has a portion S' parallel to and spaced from the member H, together with annular members W and X and packing rings Y'.

With the construction as described, in use, the tension of the spring Q will normally force the conical member P inward so as to fully engage the conical bearing I to center the same with the axis of the wheel. When, however, there is a radial shock or excessive load, the pressure of the conical bearing I against the conical member P will force the latter outward, permitting a radial displacement of the outer portion of the wheel, after which the resiliency of the spring will restore the parts to normal concentric relation. The cavity surrounding the hub in which the member P is located may be filled with lubricant which covers all of the working surfaces, including the facings O. Escape of this lubricant is, however, prevented by the seals formed by the members T, Y, W, X, and S in cooperation with the packing rings V and Y'. The same construction prevents the ingress of dust or grit and preserves the bearings from injury.

One important feature of the invention is that the energy of shocks, which cause a radial displacement of the wheel, is, to a great extent, frictionally absorbed so as to prevent sudden recoil. This is accomplished by the facings of fibrous or friction material upon the hub flange, which resist displacement and retard the action. Consequently, instead of a violent recoil, the radial movement of the wheel is slowed down.

If the wheel is used as a driving wheel, the torque is transmitted from the hub to the annular member through a driving pin. This as shown consists of the pin Z, preferably with the roller Z' surrounding the same and with the anti-friction roller bearings Z² therebetween. The flange N on the hub is provided with a radial slot at one point thereof, forming the guides Z³ for engaging the roller Z'. Thus, in operation, the annular member is free to be radially displaced in any direction and will at all times be driven by the roller Z'.

What we claim as our invention is:

1. In a wheel, the combination with a hub, of a conical bearing member axially slidable upon said hub, a spring for yieldably holding said bearing from axial movement, an outer annular wheel member including a plurality of radial spokes and an inner ring member, the latter being provided with a conical seat for engaging said conical bearing, a flange on said hub member extending parallel to the plane of rotation, spaced plates on said ring member forming a recess for the reception of said flange, fibrous wearing material between said flange and spaced plates, a hub casing for enclosing said conical bearing and spring, said casing having a portion parallel to and spaced from said annular wheel member, and sealing means between said hub casing and said outer annular member, permitting the radial movement of the latter and adapted to retain lubricant within said casing and to exclude the entrance of dust.

2. In a wheel, the combination with a hub, of a conical bearing member axially slidable on said hub, a spring for yieldably resisting movement of said bearing member, an outer annular wheel member provided with a conical seat for engaging said conical bearing, plates parallel to the plane of rotation on said hub and annular member for holding the latter in said plane of rotation, fibrous facings between the adjacent faces of said plates, sealing members secured to said annular member and hub having annular portions and portions extending parallel to each other and to the plane of rotation, and fibrous rings between said sealing members.

3. The combination with a hub, of a conical member axially slidable on said hub, a spring for yieldably holding said bearing member from axial movement, an outer annular wheel member having a conical seat for engaging said conical bearing, coacting plates respectively on said hub and annular member parallel to the plane of rotation and adapted to hold said annular member in said plane while permitting radial movement thereof, a hub casing for enclosing said bearing member and spring, and a dust and oil seal between said hub casing member and annular member comprising parallelly arranged sheet metal plates secured to said members, respectively, said plates having portions arranged in overlapped relation and fibrous packing between the overlapped portions of said plates.

4. In a wheel, the combination with a hub, of a conical bearing member axially slidable upon said hub, a spring for yieldably holding said bearing member from axial movement, a brake drum having a flange parallel to the plane of rotation secured to said hub, an outer annular wheel member having a conical seat for engaging said conical bearing and provided with spaced parallel plates, a flange on said hub spaced from the flange on said brake drum and engaging the recess between said spaced parallel plates, overlapping sheet metal members arranged between said brake drum flange and one of said plates on said annular member and secured respectively thereto, and packing material between said sheet metal members for forming a dust and oil seal.

5. In a wheel, the combination with a hub, of a conical bearing member axially slidable upon said hub, a spring for yieldably holding said bearing member from axial movement, a brake drum having a flange parallel to the plane of rotation and secured to said hub, an outer annular wheel member having a conical seat for engagement with said conical bearing and provided with spaced parallel plates, a flange on said hub spaced from the flange on said brake drum and engaging the recess between said spaced parallel plates, a sheet metal member arranged between said brake drum and one of said plates, and packing material carried by said sheet metal member for forming a dust and oil seal.

6. In a wheel, the combination with a hub, of a conical bearing axially slidable on said hub, an outer annular wheel member having a conical seat for engagement with said conical bearing, a spring for yieldably resisting axial movement of said bearing, coacting parallel faces on said hub and outer annular members for holding the latter in the plane of rotation, fibrous wearing surfaces between said coacting members, and dust guards upon opposite sides of said wheel member for sealing the joint between said outer annular wheel member and said hub for retaining lubricant and excluding dust.

7. In a wheel, the combination with a hub, of a conical bearing axially slidable upon said hub, an outer annular member provided with a conical seat normally supported on said conical bearing, a spring for yieldably resisting the axial movement of said conical bearing, an annular plate secured to said annular member and having an offset portion, an annular plate secured to said offset portion, an annular flange formed on said hub movable between said plates, and a facing of friction material upon opposite sides of said flange for taking the wear and for sealing the joint therebetween.

8. In a wheel, the combination with a hub, of a flange extending radially outward therefrom, an annular outer wheel member universally radially displaceable with respect to said hub and provided with spaced bearing plates for engaging said flange, said flange having a slot formed therein, a driving pin movable in the slot in said flange, a roller surrounding said pin and engageable with the sides of said slot, and anti-friction bearings between said roller and pin.

9. In a wheel, the combination with a hub, of a conical bearing axially slidable on said hub, yieldable means for holding said bearing from axial movement, an outer wheel member having a conical seat for engagement with said conical bearing and provided with spaced plates, and a flange between said spaced plates and normally surrounding said conical bearing, said flange having an offset portion secured to said hub.

10. In a wheel, the combination with a hub, of a conical bearing member axially slidable upon said hub, yieldable means for holding said bearing member from axial movement, an outer wheel member having a conical seat for engagement with said conical bearing and provided with spaced plates, a flange on said hub disposed in the recess between said spaced plates, a brake drum having a flange parallel to the plane of rotation and secured to said hub, and a dust guard secured to said hub and arranged between said brake drum and one of said plates.

11. In a wheel, the combination with a hub, of a conical bearing member axially slidable upon said hub, yieldable means for holding said bearing member from axial movement, an outer wheel member having a conical seat for engagement with said conical bearing and provided with spaced plates, a flange on said hub disposed in the recess between said spaced plates, a brake drum having a flange parallel to the plane of rotation and secured to said hub, an annular member arranged between said brake drum and one of said plates, and packing material carried by said annular member for forming a dust and oil seal.

12. In a wheel, the combination with a hub, of a conical bearing member axially slidable upon said hub, yieldable means for holding said bearing member from axial movement, an outer wheel member having a conical seat for engagement with said conical bearing and provided with spaced plates, a flange on said hub disposed in the recess between said spaced plates, a brake drum having a flange parallel to the plane of rotation and secured to said hub, a sheet metal member arranged between said brake drum and one of said plates, and packing material carried by said sheet metal member for forming a dust and oil seal.

13. In a wheel, the combination with a hub and a brake drum secured thereto, of a conical bearing axially slidable on said hub, an outer annular wheel member having a conical seat for engaging said conical bearing, a yieldable element for resisting the axial movement of said bearing, coacting parallel faces on said hub and outer annular member for holding the latter in the plane of rotation, and means for sealing the joint between said outer annular wheel member and said hub for retaining lubricant and excluding dust, said sealing means including plates secured respectively to said brake drum and wheel member, said plates having portions arranged in overlapped relation, and packing rings between the overlapped portions of said plates.

In testimony whereof we affix our signatures.

FRANK V. ELBERTZ.
GIUSEPPE FERRARI.